US011949192B2

(12) United States Patent
Li

(10) Patent No.: US 11,949,192 B2
(45) Date of Patent: Apr. 2, 2024

(54) HDMI CABLE

(71) Applicant: Jining Avove Electronic Technology Co., Ltd., Shandong (CN)

(72) Inventor: Xianjun Li, Shandong (CN)

(73) Assignee: JINING AVOVE ELECTRONIC TECHNOLOGY CO., LTD., Shandong (CN)

( * ) Notice: Subject to any disclaimer, the term of this patent is extended or adjusted under 35 U.S.C. 154(b) by 303 days.

(21) Appl. No.: 17/431,834

(22) PCT Filed: Jul. 9, 2019

(86) PCT No.: PCT/CN2019/095215
§ 371 (c)(1),
(2) Date: Aug. 18, 2021

(87) PCT Pub. No.: WO2020/168670
PCT Pub. Date: Aug. 27, 2020

(65) Prior Publication Data

US 2022/0140543 A1 May 5, 2022

(30) Foreign Application Priority Data

Feb. 18, 2019 (CN) ........................ 201910120662.5

(51) Int. Cl.
*H01R 13/6585* (2011.01)
*H01R 13/6591* (2011.01)
*H01R 43/02* (2006.01)

(52) U.S. Cl.
CPC ... *H01R 13/6585* (2013.01); *H01R 13/65914* (2020.08); *H01R 43/0249* (2013.01)

(58) Field of Classification Search
CPC .......... H01R 13/6585; H01R 13/65914; H01R 43/0249; H01R 13/6594; H01R 13/502;
(Continued)

(56) References Cited

U.S. PATENT DOCUMENTS 10,337,721 B2 * 7/2019 Soken .................... H01B 17/66
2009/0197467 A1 8/2009 Ko et al.

FOREIGN PATENT DOCUMENTS

CN 201178210 Y 1/2009
CN 202549480 U 11/2012
(Continued)

*Primary Examiner* — Briggitte R. Hammond
(74) *Attorney, Agent, or Firm* — SALIWANCHIK, LLOYD & EISENSCHENK

(57) ABSTRACT

The present disclosure provides an HDMI cable, including: a connector (7), the connector including an HDMI interface, an outer sheath, and a comb connecting end configured for electrical connection with a cable termination comb (6), the comb connecting end being provided with a plurality of lead bonding pads (71); an HDMI wire (100), including a plurality of leads (81) for transmitting data and signals, and a grounding line; and a cable termination comb (6), which is made from a conductive material and configured for inserting and fixing the respective leads (81) of HDMI wire (100), the lead termination comb further including one or more grounding terminals (64) extending toward the connector; wherein the grounding terminals (64) and the leads (81) are electrically connected to the corresponding lead bonding pads (71) of the connector (7).

7 Claims, 4 Drawing Sheets

(58) Field of Classification Search
CPC .. H01R 13/648; H01R 13/6581; H01R 27/00; H01R 43/0263
See application file for complete search history.

(56) References Cited

FOREIGN PATENT DOCUMENTS

| | | | | |
|---|---|---|---|---|
| CN | 104810703 | A | | 7/2015 |
| CN | 206907541 | U | | 1/2018 |
| CN | 108063326 | A | | 5/2018 |
| CN | 207690557 | U | | 8/2018 |
| CN | 211480362 | U | * | 9/2020 |
| IN | 204103117 | U | | 1/2015 |
| JP | 2017022031 | A | | 1/2017 |

* cited by examiner

HDMI CABLE

CROSS REFERENCE TO RELATED APPLICATIONS

This application is a National Stage of International Application No. PCT/CN2019/095215, filed on Jul. 9, 2019, which claims priority to Chinese Patent Application No. 201910120662.5, filed on Feb. 18, 2019; both of which are hereby incorporated by reference in their entireties.

TECHNICAL FIELD

The present disclosure relates to the field of wire technology, and in particular to an HDMI cable with a cable termination comb inside.

BACKGROUND

With the rapid development of multimedia technology, there has been an increasing demand for multimedia transmission quality, especially for high-definition multimedia. Consequently, multimedia for simply transmitting video or audio signals can no longer meet the demands of today's society. A High Definition Multimedia Interface cable or an HDMI cable in short, is a digital video/audio interface technology capable of transmitting uncompressed high definition video and multi-channel audio data of high quality. It guarantees transmission of video and audio signals of the highest quality without digital/analog or analog/digital conversion before signal transmission.

FIG. 1 is a perspective view showing an HDMI cable connector in the prior art; and FIG. 2 is a cross-sectional view showing a structure of a coaxial wire for HDMI in the prior art. The coaxial wire for HDMI as shown in FIG. 2 includes a plurality of twinaxial data lines 100 and a plurality of uniaxial signal lines 200, the plurality of twinaxial data lines 100 and the plurality of uniaxial signal lines 200 being stranded with each other.

FIG. 3 is a schematic diagram showing a state in which the HDMI cable connector and the coaxial wire in the prior art are directly terminated. Generally, the method for terminating an HDMI cable is to cut and peel off an outer jacket and an outer shielding layer at one end of the coaxial wire 8 for HDMI, and to sequentially separate and weld respective leads 81 to respective lead bonding pads 71 of the connector 7. Since the respective leads 81 are irregularly arranged and are in large quantity, the welding can only be completed in a manual mode, resulting in a poor working efficiency.

Furthermore, a solution for connecting an HDMI cable connector and a coaxial wire for HDMI by a relay circuit board has also been proposed. As shown in FIG. 4, a relay circuit board 72 is provided between the coaxial wire 8 for HDMI and the connector 7. A plurality of lead bonding pads 722 for welding the respective leads 81 of the coaxial wire 8 are arranged on one side of the relay circuit board 72, and a plurality of connector pads 721 for welding to the connector 7 are arranged on the other side of the relay circuit board 72. The pitch and arrangement of the connector pads 721 correspond to those of the respective connection terminals of the HDMI cable connector; and the plurality of lead bonding pads 722 and the plurality of connector pads 721 are correspondingly electrically connected by printed wiring. Preferably, the pitch between the lead bonding pads 722 is greater than the pitch between the connector pads 721, so as to facilitate welding of the respective leads 81 of the coaxial wire 8 onto the lead bonding pads. When using the relay circuit board 72 as described above, respective leads 81 of the coaxial wire 8 are firstly welded to respective lead bonding pads 722 of the relay circuit board 72 in sequence, and then the connector pads 721 are aligned to the connection terminals of the connector 7. Next, the relay circuit board 72 is welded to the connector 7 by, for example, a press welding process. With the relay circuit board as described above, although the operation convenience of welding the respective leads of a coaxial cable is improved, additional components and welding operation are required, and newly added printed circuit board may further degrade signal integrity.

Furthermore, in the prior art as described above, in order to weld leads of a coaxial wire, a certain length of the shielding layer of each lead must be peeled off, resulting in greatly reduced electromagnetic interference resistance of the leads with the shielding layer peeled off and of the relay circuit board, and being prone to distortion of data and signals in transmission.

Therefore, there is a need to develop an HDMI cable connector that can connect respective leads of a coaxial wire to an HDMI cable connector conveniently and quickly, and can maintain the electromagnetic interference resistance of the HDMI cable.

SUMMARY

To solve the above problems, the present disclosure provides an HDMI cable with improved assembly efficiency and enhanced resistance against external electromagnetic interference.

The present disclosure provides an HDMI cable, including: a connector, including an HDMI interface, an outer sheath, and a comb connecting end configured for electrical connection with a cable termination comb, the comb connecting end being provided with a plurality of lead bonding pads; an HDMI wire, including a plurality of leads for transmitting data and signals, and a grounding line; and a lead termination comb made from a conductive material and configured for inserting and fixing respective leads of the HDMI wire, the lead termination comb further comprising one or more grounding terminals extending toward the connector; wherein the grounding terminals and the leads are electrically connected to the corresponding lead bonding pads of the connector.

Furthermore, the grounding line of the HDMI wire may be electrically connected with a body of the lead termination comb.

Furthermore, the lead termination comb, in its entirety, may be integrally formed via a metal stamping process.

Furthermore, the lead termination comb may include a flat plate and U-shaped plates mounted on the flat plate via clamping plates. Wiring grooves are formed between adjacent U-shaped plates, and respective leads are inserted and fixed in the wiring grooves.

Furthermore, two side walls of the U-shaped plates may be each provided on both surfaces thereof with a first protruding portion extending in an inclined downward direction and a second protruding portion extending obliquely in a direction away from the connector.

Furthermore, the HDMI wire may include a twinaxial data wire, which twinaxial data wire includes: two data transmission lines on the innermost side, a protective layer covering the two data transmission lines, and a shielding layer winding around the protective layer, the shielding layer including a first metal foil layer on the inner side, an insulating layer in the middle and a second metal foil layer on the outer side.

Furthermore, the shielding layer may be formed by spiral winding a long-strip-shaped shielding tape around the protective layer in a sequentially overlapped manner, and during the spiral winding, one side edge of the first metal foil layer of the shielding layer overlaps one side edge of the second metal foil layer.

The present disclosure as described above, the following advantages are provided:

(1) In the prior art, in order to connect a wire with a connection terminal of the cable connector, the jacket and the outer shielding layer of the wire must be peeled off to spread the wire to facilitate welding, resulting in an overlong unshielded section of the wire, reduced signal integrity and increased crosstalk. However, in the present application, the cable termination comb is grounded, and respective leads of the HDMI wire are inserted through wiring grooves of the comb, thereby shortening the unshielded section. The grounded wiring grooves made of metal materials can have a certain shielding effect, such that the resistance against external electromagnetic interference is enhanced.

(2) With the cable termination comb, the leads can be arranged orderly without manually holding leads for welding, thereby realizing automatic welding such as hot pressure welding or laser welding, and improving efficiency and precision of the connection.

(3) Due to the compact arrangement, the length of the connector is shortened, thereby reducing the load on the HDMI Socket in the system.

(4) The wiring grooves are formed by mounting U-shaped plates with clamping plates. Accordingly, the number of the wiring grooves and the positions of the wiring grooves can be flexibly set according to the number of leads in the wire, and can adapt to cables of different standards.

BRIEF DESCRIPTION OF THE DRAWINGS

The above features and technical advantages of the present disclosure will become more apparent and readily appreciated with reference to the following drawings and the description of the embodiments herein.

DETAILED DESCRIPTION

Embodiments of a cable termination comb having a twinaxial wire according to the present disclosure and a method for terminating will be described below with reference to the accompanying drawings.

Those of ordinary skill in the art will recognize that the described embodiments can be modified in various different ways, or combinations thereof, without departing from the spirit and scope of the present disclosure. Accordingly, the drawings and the description are illustrative in nature rather than limiting the protection scope of the claims. In addition, in this specification, the drawings are not drawn to scale, and the same drawing numerals denote the same components.

Figure 5:
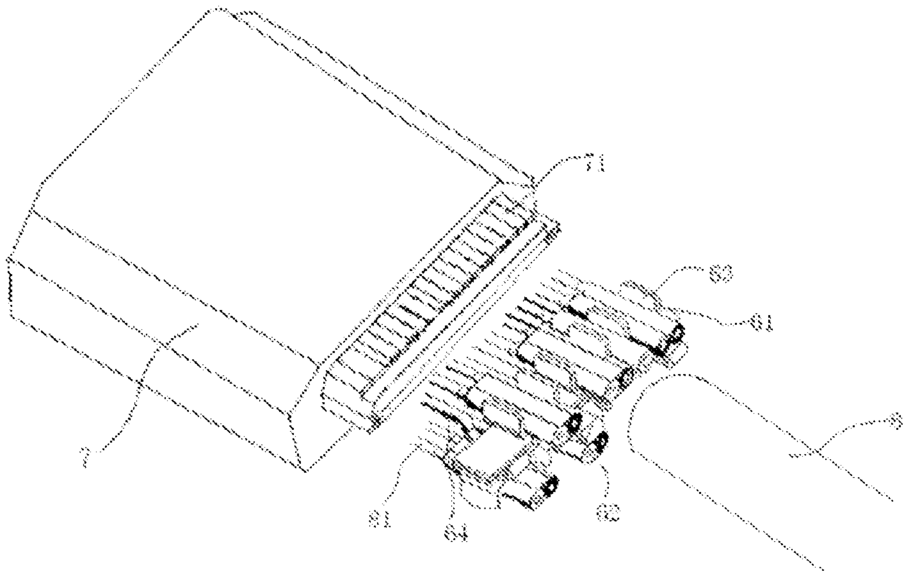
FIG. 5 is a perspective view showing an interior structure of the HDMI cable according to the present disclosure.
Figure 6:
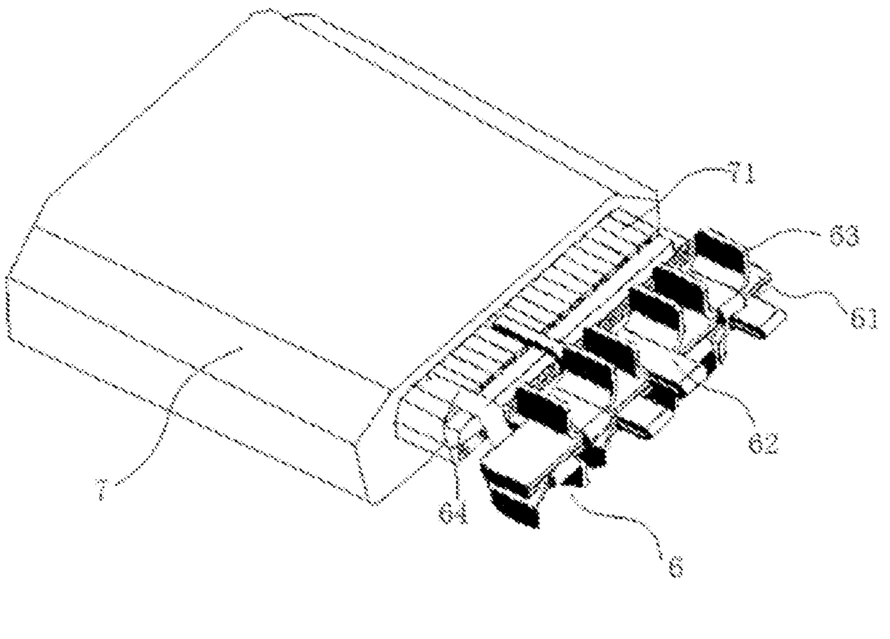
FIG. 6 is a perspective view showing a connection state of a connector and a cable termination comb in the HDMI cable according to the present disclosure.

FIG. 5 is a perspective view showing an interior structure of the HDMI cable according to the present disclosure; and FIG. 6 is a perspective view showing a connection state of the connector and the cable termination comb in the HDMI cable according to the present disclosure. As shown in FIGS. 5 and 6, the HDMI cable of the present disclosure includes a connector 7, a cable termination comb 6 and an HDMI wire.

The connector 7 comprises an HDMI interface configured for connecting a digital electronic device such as a computer, an outer sheath, and a comb connecting end configured for electrical connection with a cable termination comb. In addition, the outer sheath can be also provided therein with a circuit for connecting the HDMI interface to the comb connecting end. At the comb connecting end, a plurality of lead bonding pads is provided for electrical connection with bonding pads on the cable termination comb.

The cable termination comb is integrally formed from conductive materials such as an aluminum sheet or a stainless steel sheet via a metal stamping process, or may also be formed by combining a plurality of comb components made from conductive materials. In short, the cable termination comb according to the present disclosure, as a whole, has conductive properties.

The cable termination comb has a plurality of wiring grooves, each wiring groove having an opening configured for inserting the respective lead of the HDMI wire. Of course, the wiring grooves may also be in the form of holes.

The structure of a combined cable termination comb is illustrated in FIG. 6. The cable termination comb 6 comprises a flat plate 61 and U-shaped plates 63 mounted on the flat plate 61 via clamping plates 62, wherein the bottom of the U-shaped plates 63 is attached to the flat plate 61. The clamping plates 62 are also U-shaped, and two inner sides of the U-shaped grooves of clamping plates 62 are in contact with the bottom inner sides of the U-shaped plates 63 and the lower surface of the flat plate 61, thereby fixing the U-shaped plates 63 to the flat plate 61. Of course, it is also possible to arrange one respective U-shaped plate 63 on each of the upper surface and the lower surface of the flat plate 61, the bottoms of the two U-shaped plates 63 are in contact with the surface of the flat plate 61, and the two inner sides of the U-shaped grooves of clamping plates 62 are in contact with the bottom inner sides of the U-shaped plates 63, respectively, thereby fixing the two U-shaped plates 63 to the flat plate 61. The U-shaped plates 63 may also be mounted in combination with grounding terminals 64 described below, both may be fixed to the flat plate 61 via the clamping plates 62, which is not be described in detail herein.

Wiring grooves are formed between adjacent U-shaped plates 63. The opening of each wiring groove is perpendicular to the plane where the lead bonding pads 71 of the connector 7 are located. As can be seen from FIG. 6, the connector 7 has a plurality of lead bonding pads 71 for connection with respective leads 81 of the HDMI wire. If the connector 7 is of a structure in which the lead bonding pads

71 are disposed on both the upper and lower sides thereof, the U-shaped plates 63 can be mounted on both the upper and lower surfaces of the flat plate 61 in the cable termination comb, respectively, such that the leads 81 can be placed in respective wiring grooves. Specifically, if a lead 81 is to connect with a lead bonding pad 71 on the upper side, the lead 81 is inserted into a wiring groove on the upper side of the flat plate 61; or if the lead 81 is to connect with a lead bonding pad 71 on the lower side, the lead 81 is inserted into a wiring groove on the lower side of the flat plate 61.

The cable termination comb 6 further includes one or more grounding terminals 64 extending from the comb body toward the connector 7. The grounding terminals 64 are disposed at positions corresponding to the lead bonding pads configured for grounding of the connector 7.

The cable termination comb of this embodiment is merely exemplary. The cable termination comb 6 may also be integrally formed via a stamping process, and wiring grooves for receiving wires and grounding terminals for grounding may be formed during the forming process. This embodiment is not intended to limit the structure of the comb as long as it has the wiring grooves and grounding terminals.

When the HDMI cable is assembled, the jackets and the shielding layers of the respective leads of the HDMI wire are firstly peeled off to a predetermined length to expose the metal leads, and then the respective leads 81 with jackets are inserted into and fixed in the corresponding wiring grooves of the cable termination comb according to the correspondence between the respective leads and the lead bonding pads of the connector. For example, a twinaxial data line does not need to be separated, as long as it is inserted into and fixed in the corresponding wiring groove conjointly, while the grounding line of the HDMI wire needs to be directly connected to the body of the cable termination comb. Alternatively, when the shielding layer of the HDMI wire has a grounding function, it is also possible for the shielding layers peeled off from leads 81 to be connected to the wiring grooves of the cable termination comb. In this way, the grounding line of the HDMI wire is connected to the grounding terminal via the body of cable termination comb. When the grounding terminal is electrically connected with the lead bonding pad for grounding of the connector, the grounding line of the HDMI wire is connected to the connector of the HDMI cable.

Since the respective leads are clamped and fixed by the cable termination comb 6, it can be ensured that the positions of the leads do not change, and it is easy to quickly connect the respective leads to the lead bonding pads of the connector through welding or pressure welding operations. In addition, compared with the prior art, the lead section with shielding layer peeled off is of a very short length, and the wiring grooves of the cable termination comb 6 made from metal materials also have a certain shielding effect, such that the resistance against external electromagnetic interference is enhanced.

Figure 7:
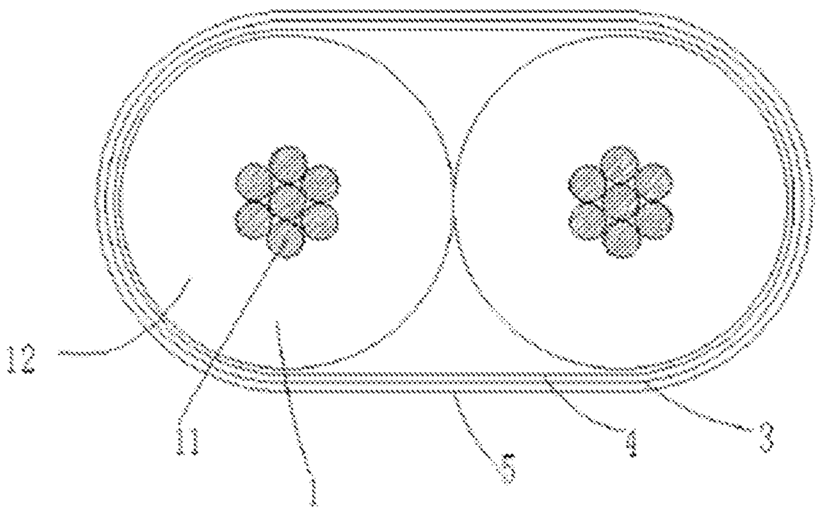
FIG. 7 is a cross-sectional view of a twinaxial data line used in the HDMI cable according to the present disclosure.
Figure 8:
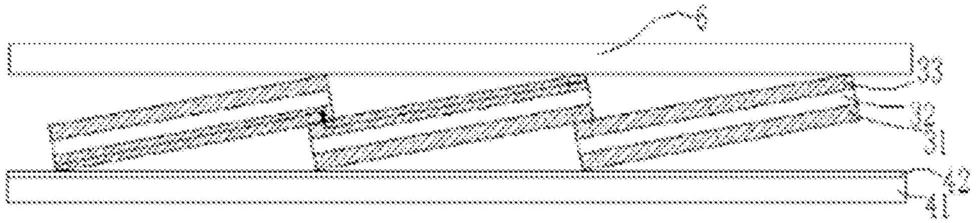
FIG. 8 is a schematic diagram showing a stranding and overlapping state of a shielding layer structure of a twinaxial data line used in the HDMI cable according to the present disclosure.

A structure of the twinaxial data wire 100 used in the HDMI wire of the present disclosure will be described in the following preferred embodiment. As shown in FIGS. 7 and 8, the twinaxial data wire 100 includes two data transmission lines 1 on the innermost side, a protective layer 4 covering the two data transmission lines 1, and a shielding layer 3 winding around the protective layer 4. Each of the data transmission lines 1 includes a core 11 made of metal leads and an outer jacket layer 12 covering the core 11. The core 11 may be either a single-strand conductor made of one piece of metal lead, or a stranded structure of a plurality of metal leads stranded with each other. The stranded structure can reduce the displacement of the core 11, and stabilize the structure and transmission parameters, thus providing high extensibility. Preferably, the core can be made of copper, with the outer side of the core 11 being coated with a BTA (Benzotriazole) layer. BTA, as a copper corrosion inhibitor, can form a film around the core 11 to avoid corrosion.

After the two data transmission lines 1 are disposed in parallel with each other, the protective layer 4, which may be formed from for example a resin material for protecting and insulating the data transmission line 1 from the outside, is formed on the peripheries of the two data transmission lines 1. Preferably, the protective layer 4 may be a polyester film tape partially coated with an adhesive.

The protective layer 4 may be formed by spiral winding a long-strip-shaped polyester film tape around the peripheries of the two data transmission lines 1, or may be integrally formed on the peripheries of the data transmission lines 1 through a resin coating process. With the above structure, since no separate grounding line is provided and the protective layer 4 is formed on the peripheries of the data transmission lines 1, a stronger and greater restraining force can be provided, thereby reducing the possibility of a sharp increase in signal attenuation.

Figure 4:
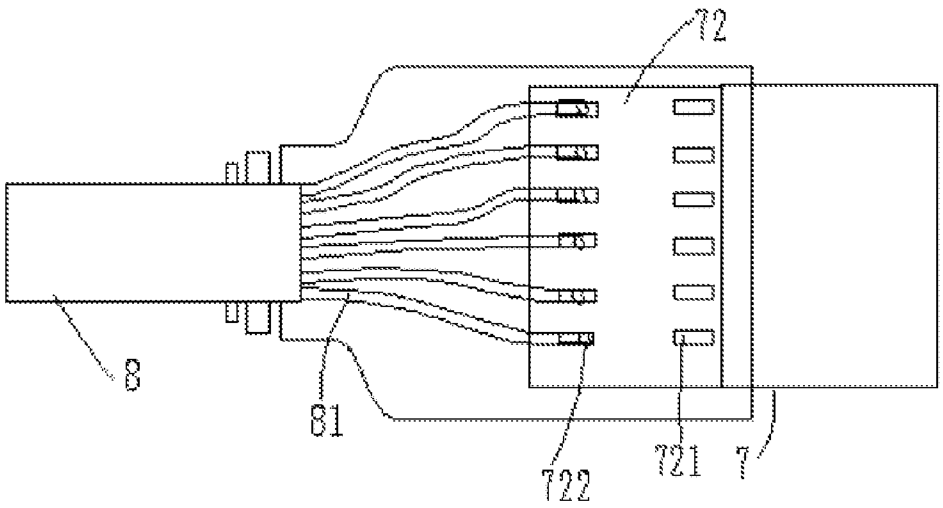
FIG. 4 (Prior Art)
FIG. 4 is a schematic diagram showing a state in which an HDMI wire in the prior art is connected to an HDMI cable connector through a relay circuit board.

Furthermore, the shielding layer 3 is provided on the periphery of the protective layer 4. As shown in FIG. 4, the shielding layer 3 includes a first metal foil layer 31 on the inner side, an insulating layer 32 in the middle, and a second metal foil layer 33 on the outer side. Preferably, the second metal foil layer 33 on the outer side and the first metal foil layer 31 may be made from metal materials such as aluminum and copper, and the insulating layer 32 may be made from an FEP (Fluorinated ethylene propylene) material, a polyester film tape, etc.

Figure 1:
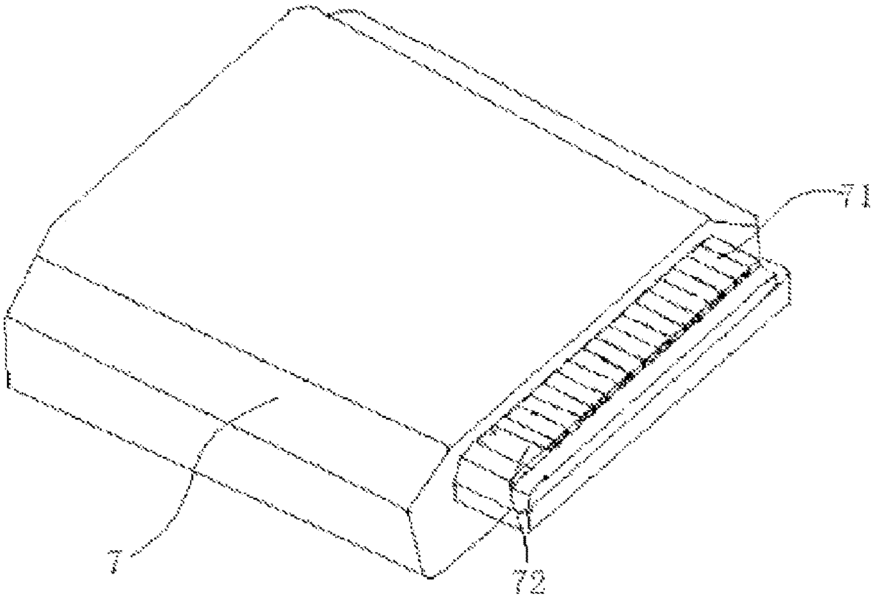
FIG. 1 (Prior Art)
FIG. 1 is a perspective view showing an HDMI cable connector in the prior art.
Figure 2:
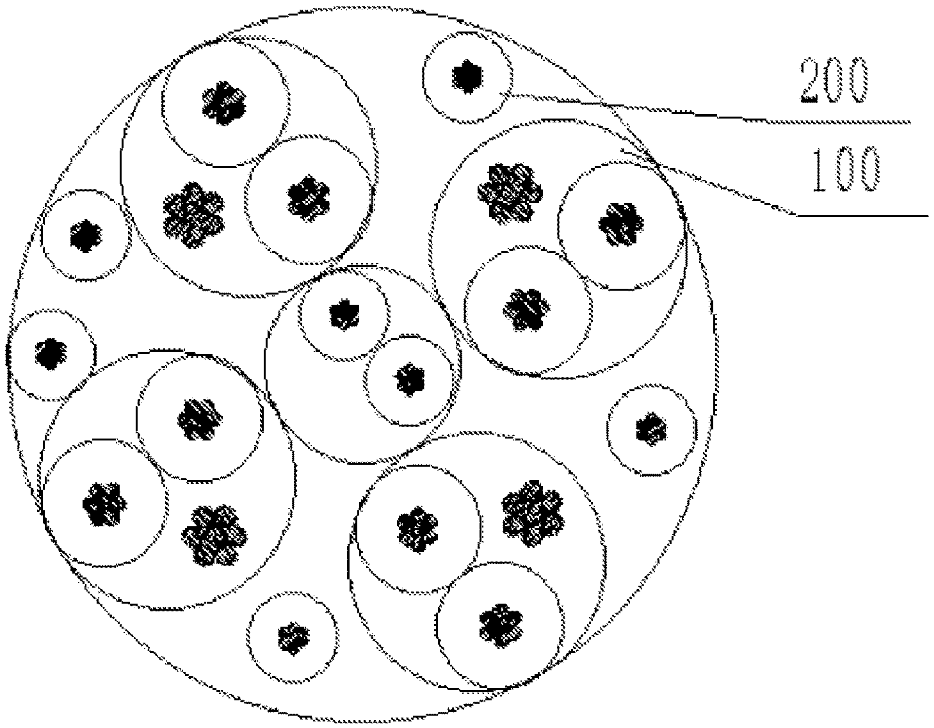
FIG. 2 (Prior Art)
FIG. 2 is a cross-sectional view showing a structure of a coaxial wire for HDMI in the prior art.
Figure 3:
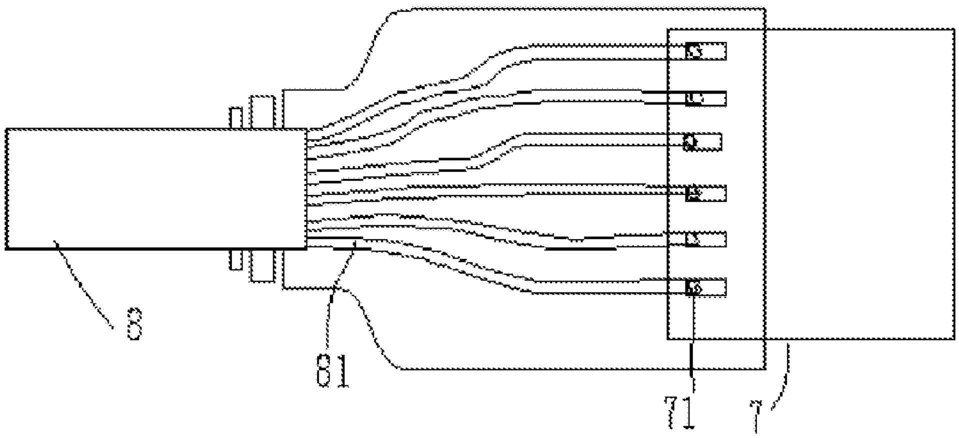
FIG. 3 (Prior Art)
FIG. 3 is a schematic diagram showing a state in which an HDMI cable connector and a coaxial wire in the prior art are directly terminated.

The shielding layer 3 is formed by spiral winding a long-strip-shaped shielding tape around the protective layer 4 in a sequentially overlapped manner, and in the winding process, one side edge of the first metal foil layer 31 of the shielding layer 3 overlaps one side edge of the second metal foil layer 33, such that the adjacent first metal foil layer 31 and second metal foil layer 33 are in electrical contact with each other. Thus, compared with the data wire in the prior art shown in FIG. 2, the area of the complete shielding layer is increased, and the shielding effect against external electromagnetic interference is improved.

In the HDMI cable in the present disclosure, the HDMI includes the twinaxial data wire having the above-described structure, and thus the resistance against external electromagnetic interference can be enhanced during transmission of high-frequency data.

In summary, inside the HDMI cable of the present disclosure, the connector and the respective leads of the HDMI wire are connected by means of the lead termination comb, such that the HDMI cable can be quickly assembled, and the respective leads can also be fixed to prevent their movement inside. In addition, the resistance against external electromagnetic interference of the HDMI cable can be further enhanced.

The above description is only a preferred embodiment of the present disclosure and is not intended to limit the present disclosure. For those skilled in the art, various modifications and changes may be made to the present disclosure. Any amendment, equivalent replacement, or improvement made within the spirit and principle of the present disclosure shall fall within the protection scope of the present disclosure.

The invention claimed is:

1. An HDMI cable, comprising:

a connector, comprising an HDMI interface, an outer sheath, and a comb connecting end configured for electrical connection with a cable termination comb, the comb connecting end being provided with a plurality of lead bonding pads;

an HDMI wire, comprising a plurality of leads for transmitting data and signals, and a grounding line; and a cable termination comb made from a conductive material and configured for inserting and fixing respective leads of the HDMI wire, the cable termination comb further comprising one or more grounding terminals extending toward the connector;

wherein the grounding terminals and the leads are electrically connected to corresponding lead bonding pads of the connector.

2. The HDMI cable according to claim 1, wherein:

the grounding line of the HDMI wire is electrically connected with a body of the lead cable termination comb.

3. The HDMI cable according to claim 1, wherein:

the cable termination comb is integrally formed via a metal stamping process.

4. The HDMI cable according to claim 1, wherein:

the cable termination comb comprises a flat plate, and U-shaped plates mounted on the flat plate via clamping plates, with wiring grooves being formed between adjacent U-shaped plates and respective leads being inserted and fixed in the wiring grooves.

5. The HDMI cable according to claim 4, wherein:

two side walls of the U-shaped plates are each provided on both surfaces thereof with a first protruding portion extending in an inclined downward direction and a second protruding portion extending obliquely in a direction away from the connector.

6. The HDMI cable according to claim 1, wherein:

the HDMI wire comprises a twinaxial data wire, the twinaxial data wire comprising: two data transmission lines on an innermost side, a protective layer covering the two data transmission lines, and a shielding layer winding around the protective layer, the shielding layer comprising a first metal foil layer on an inner side, an insulating layer in a middle and a second metal foil layer on an outer side.

7. The HDMI cable according to claim 6, wherein:

the shielding layer is formed by spiral winding a long-strip-shaped shielding tape around the protective layer in a sequentially overlapped manner, and during the spiral winding, one side edge of the first metal foil layer of the shielding layer overlaps one side edge of the second metal foil layer.

* * * * *